July 25, 1939.  N. ANDROS  2,167,411

BUTTER FORK

Filed May 14, 1938

Inventor
NICHOLAS ANDROS

By J. B. Dickman, Jr.
Attorney

Patented July 25, 1939

2,167,411

UNITED STATES PATENT OFFICE 2,167,411

BUTTER FORK

Nicholas Andros, Los Angeles, Calif.

Application May 14, 1938, Serial No. 208,074

3 Claims. (Cl. 30—129)

The present invention relates to butter forks, and in the serving of food in restaurants, hotel dining rooms and the like, the server of food has to be very meticulous, and particularly is this so with butter, in order that the squares, when pierced by the instrument do not break. If in the spearing of the butter the square becomes broken, when the server is about to serve a patron the butter usually falls on the clothes of those being served, thus damaging them. The reason for the butter being damaged is usually due first to the heavy tines on a fork that are arranged in a straight line and second the server trying to remove the butter from the tines onto a plate.

It is therefore an object of the present invention to provide a butter fork that may be used by waiters, and waitresses in restaurants, hotel dining rooms and like places where food is served, without fear of damaging the square of butter when engaged by the fork, or the clothes of patrons.

Another object of the present invention is the provision of a butter fork with means that will firmly grasp squares of butter without damage to the butter square.

Another object of the present invention is the provision of a butter fork provided with means that will engage the greater surface of the butter square and remove the square from the tines of the fork in an expeditious manner without damage.

A still further object of the present invention is the provision of a butter fork that is adapted for use with one hand of the user, giving the user full use of the other hand.

With these and other objects in view, the invention consists in the combination and arrangement of parts to be hereinafter described and claimed, reference being had to the accompanying drawing in which like numerals of reference indicate similar parts in the several views, and wherein:

Figure 1:
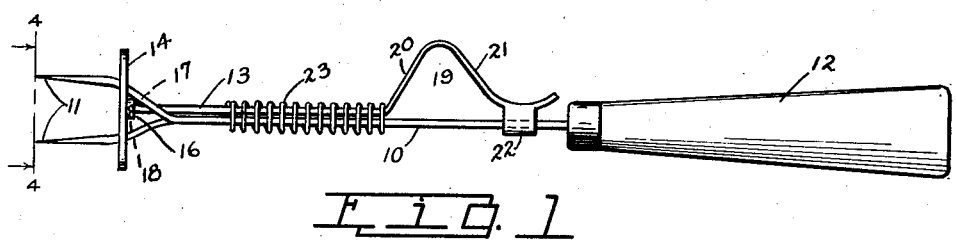
Figure 1 is a side elevational view of my novel butter fork, and illustrating my novel butter removing means.
Figure 2:
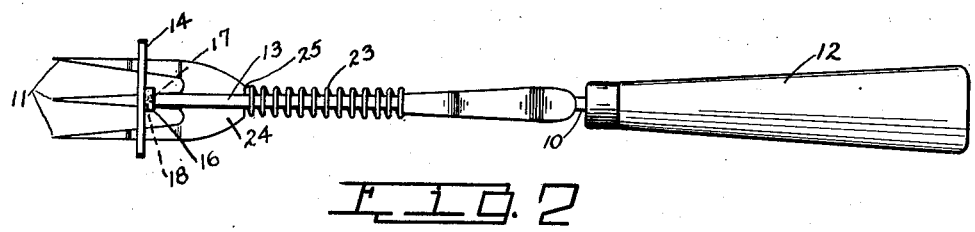
Figure 2 is a top plan view of my novel butter fork and illustrating how the removing means is secured to a rod.
Figure 3:
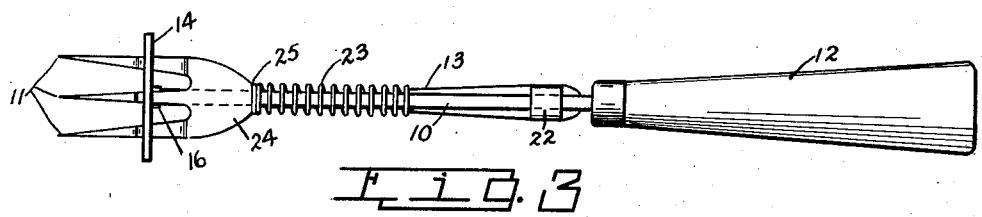
Figure 3 is a bottom view of Figure 2.
Figure 4:
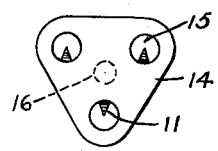
Figure 4 is an end view on line 4—4 of Figure 1, looking in the direction of the arrows and illustrating the arrangement of the tines and the configuration of the butter engaging means.

Referring to the drawing, the numeral 10 represents the shank of my novel fork, one end of which is provided with a plurality of tines 11 that are arranged in a substantially triangular configuration, the other end of the shank is provided with a handle 12. Parallel to the shank 10 is a rod 13 that is positioned on the top face of the shank 10 as illustrated in Figures 1 and 2, one end of the rod 13 being threaded. A plate 14 of substantially triangular configuration, having a plurality of apertures 15, and a flange 16, is positioned on the end of the rod 13 and is held in detachable engagement by the threaded portion 17 of the rod 13 engaging the internal threads 18 in the flange 16. It is to be noted that the apertures 15 are in excess of the size of the tines 11 for a purpose to be later described. A portion of the other end of the rod 13 is bent to form a substantially V-shaped portion 19 having legs 20 and 21, the end of the rod 13 being provided with an integral slide 22.

Encircling the shank 10 and the rod 13 is a spring 23 one end of which abuts against the tine body portion 24 at 25 the other end against the angular leg portion 20 of the rod 13.

The spring 23 normally holds the rod 13 and plate 14 in a retracted position. When the user of the fork has speared a square of butter on the tines 11, due to the arrangement of the tines a firm grip is had and in order to remove the square of butter it is simply necessary for the user to push with the thumb against the leg 21 of the rod 13, the rod 13, slide 22 and plate 14 move forward, the plate engaging the square of butter and removing same from the tines.

Changes in detail may be made without departing from the scope of the claims hereto appended.

What I claim is:

1. A butter fork comprising a shank, a handle on one end of said shank, a slidable rod on said shank, tines on the other end of said shank and arranged in a substantially triangular configuration, means for removing butter from the tines comprising a plate of substantially triangular configuration and detachably secured to said slidable rod, said slidable rod having a V-shaped portion and a slide.

2. A butter fork comprising a shank, a handle on one end of said shank, a slidable rod on said shank, tines on the other end of said shank and arranged in a substantially triangular configuration, means for removing butter from said tines comprising a plate of substantially triangular configuration and detachably secured to said slidable rod, the said plate having a plurality of apertures through which the tines pass, said slidable rod having a V-shaped portion and an integral slide.

3. A butter fork comprising a shank, a handle on one end of said shank, a slidable rod on said shank, tines on the opposite end and arranged in a substantially triangular configuration, means for removing butter from said tines comprising a plate of substantially triangular configuration and detachably secured to said slidable rod, the said plate having a plurality of apertures through which the tines move said slidable rod having a V-shaped portion and an integral slide, and a spring encircling said shank and rod for normally holding said rod in retracted position.

NICHOLAS ANDROS.